(12) United States Patent
Diab (10) Patent No.: US 8,082,453 B2
(45) Date of Patent: Dec. 20, 2011

(54) POWER SHARING BETWEEN MIDSPAN AND ENDSPAN FOR HIGHER POWER POE

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1101 days.

(21) Appl. No.: 11/898,152

(22) Filed: Sep. 10, 2007

(65) Prior Publication Data

US 2009/0063874 A1 Mar. 5, 2009

Related U.S. Application Data

(60) Provisional application No. 60/935,703, filed on Aug. 27, 2007.

(51) Int. Cl.
*G06F 1/26* (2006.01)

(52) U.S. Cl. .......................................... 713/300; 307/29

(58) Field of Classification Search ................... 713/300; 307/29
See application file for complete search history.

(56) References Cited

U.S. PATENT DOCUMENTS

| | | | |
|---|---|---|---|
| 7,299,368 B2 * | 11/2007 | Peker et al. | 713/300 |
| 7,400,062 B2 * | 7/2008 | Pincu et al. | 307/29 |
| 7,492,059 B2 * | 2/2009 | Peker et al. | 307/71 |

\* cited by examiner

*Primary Examiner* — Albert Wang
(74) *Attorney, Agent, or Firm* — Sterne, Kessler, Goldstein & Fox P.L.L.C.

(57) ABSTRACT

Methods and systems for higher power PoE are provided. Embodiments overcome system limitations to PSE power scaling by using an endspan-midspan configuration which allocates power to the PD from both an endspan PSE and a midspan PSE. Embodiments are particularly suitable for deployed PoE systems having limited power supplies and/or ports designed for lower power. Further, embodiments include power management schemes to enable the proposed endspan-midspan configuration to intelligently allocate power between the endspan PSE and the midspan PSE according to required PD power.

24 Claims, 11 Drawing Sheets

POWER SHARING BETWEEN MIDSPAN AND ENDSPAN FOR HIGHER POWER POE

CROSS-REFERENCE TO RELATED APPLICATIONS

The present application claims the benefit of U.S. Provisional Patent Application No. 60/935,703, filed Aug. 27, 2007, which is incorporated herein by reference in its entirety.

BACKGROUND OF THE INVENTION

1. Field of the Invention

The present invention relates generally to Power over Ethernet (PoE), and more particularly to higher power PoE.

2. Background Art

Ethernet communications provide high speed communications between data terminals.

Power over Ethernet (PoE) systems enable power transmission over the same transmission lines that carry data in an Ethernet link. Generally, power is generated at a Power Source Equipment (PSE) side of the PoE system and is carried over an Ethernet cable to a Powered Device (PD) side of the PoE system.

Today, enabling higher power PoE systems that comply with current IEEE PoE standards faces challenges. Particularly, system limitations exist to supporting higher power supply in PoE systems. These limitations are most problematic in the case of already deployed PoE systems, where a system upgrade to increase power supply might be very difficult or require complete replacement of system equipment. This may be the case, for example, for existing PoE systems having limited power supply capabilities and/or ports designed for lower power (e.g., chassis or stackable PoE systems).

There is a need therefore to overcome the above described system limitations to enable higher power PoE systems.

BRIEF SUMMARY OF THE INVENTION

Methods and systems for higher power PoE are provided herein.

Embodiments include PoE system configurations that enable concurrent usage of endspan and midspan powering in a PoE system. As such, embodiments can be designed to fully exploit the maximum power transmission capacity of the Ethernet cable connecting the PSE to the PD in a PoE system.

Further, embodiments overcome system limitations to PSE power scaling by using an endspan-midspan configuration which allocates power to the PD from both an endspan PSE and a midspan PSE.

Further still, embodiments include power management schemes to enable the proposed endspan-midspan configuration to intelligently allocate power between the endspan PSE and the midspan PSE according to required PD power.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Overview

Today, enabling higher power PoE systems that comply with current IEEE PoE standards faces challenges. Particularly, system limitations exist to supporting higher power supply in PoE systems. These limitations are most problematic in the case of already deployed PoE systems, where a system upgrade to increase power supply might be very difficult or require complete replacement of system equipment. Indeed, while it may be easy to upgrade a chassis-based system's line card to support higher power levels per port, it is very difficult to scale a system's power supply to provide higher power as most chassis systems are already deployed. This may be the case, for example, for existing PoE systems having limited power supply capabilities and/or ports designed for lower power (e.g., chassis or stackable PoE systems).

Accordingly, there is a need to overcome the above described system limitations to enable higher power PoE systems.

Embodiments of to the present invention include PoE systems and methods to enable higher power PoE systems.

In one aspect, embodiments of the present invention include PoE system configurations that enable concurrent usage of endspan and midspan powering in a PoE system. As such, embodiments can be designed to fully exploit the maximum power transmission capacity of the Ethernet cable connecting the PSE side to the PD side.

In another aspect, embodiments of the present invention overcome the above described PSE system limitations by using an endspan-midspan configuration which allocates power to the PD from both an endspan PSE and a midspan PSE. As such, the need for power supply scaling at the PSE is negated. In addition, the endspan-midspan configuration provides a suitable solution to scale the power of already deployed PoE systems.

Further, embodiments of the present invention include power management schemes to enable the proposed endspan-midspan configuration to intelligently allocate power between the endspan PSE and the midspan PSE according to required PD power.

Introduction

Figure 1:
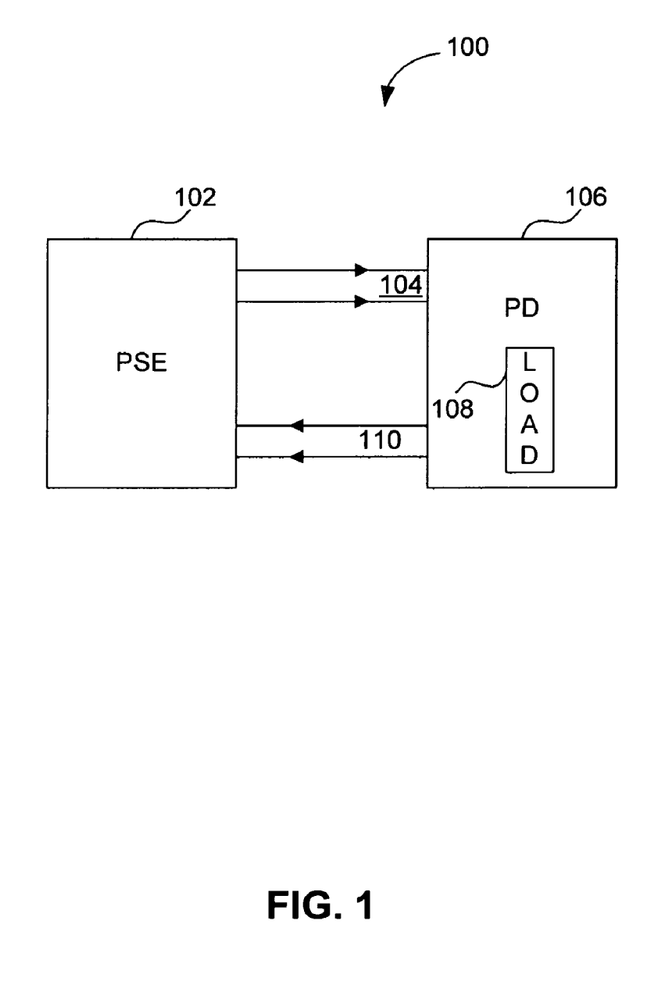
FIG. 1 is a block diagram of a conventional Power over Ethernet (PoE) system.

FIG. 1 illustrates a high level diagram of a conventional Power over Ethernet (PoE) system 100 that provides both DC power and data communications over a common data communications medium. Referring to FIG. 1, power source equipment 102 provides DC power over conductors 104, 110 to a powered device (PD) 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
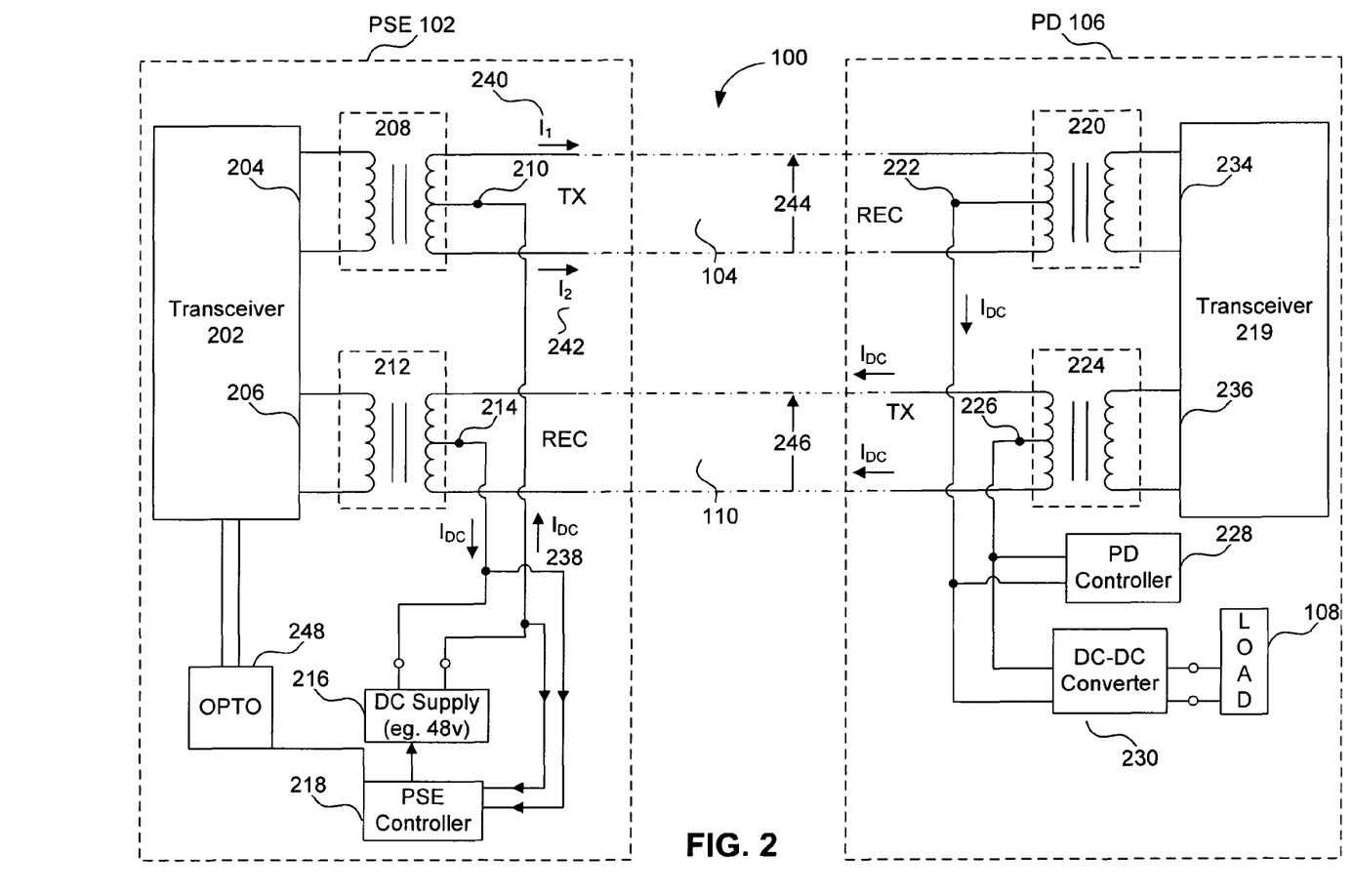
FIG. 2 illustrates a more detailed illustration of a conventional power PoE system.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3 standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not effected by the DC power transfer.

Midspan PSE Configurations

As discussed above, in one example, the PSE 102 is a data switch that that is communicating data traffic with one or more PD devices, such as Internet phones, or a wireless access point. The data switch has an input row of data ports and an output row of data ports, where any one of the input data ports can to be switched to any one of the output data ports. Each data port typically includes a serial-to-parallel (i.e. SERDES) transceiver so that data can be received and transmitted using high speed serial techniques, but are processed in parallel on chip.

Despite the advantages of PoE, many existing communications links do not utilize PoE. Accordingly, some existing switches are data-only switches that do not support power transfer, i.e., they are non-PoE switches. However, often these data-only switches may need to communicate with PD devices on a small number of their ports. In this scenario, a midspan switch is connected between the data-only switch and the PD devices so as to inject the DC power for the PD devices. This is known as a midspan PSE (the PSE is within a midspan switch) configuration, whereas an endspan PSE configuration (the PSE is within the data switch) is as described above in FIG. 2.

Figure 3:
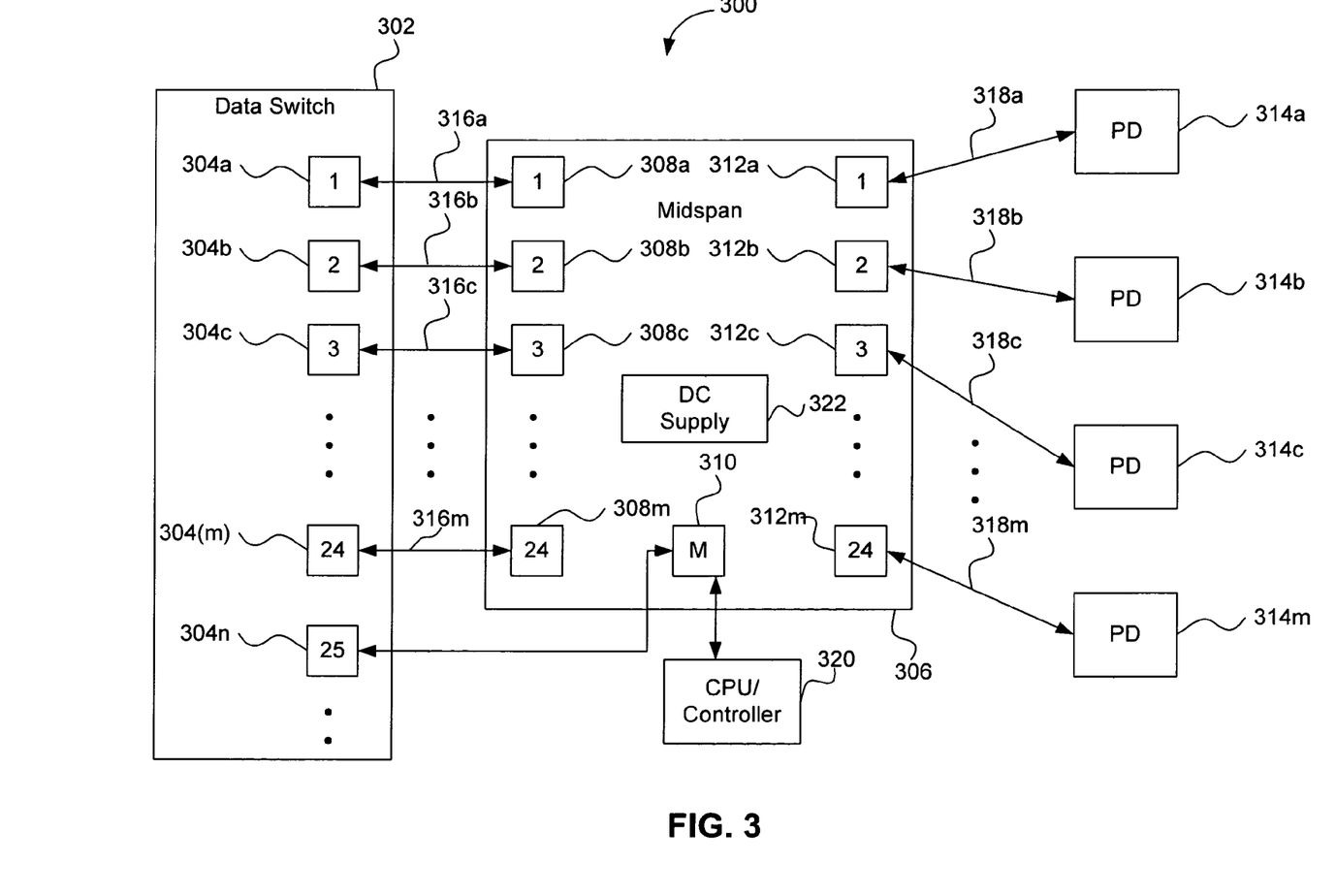
FIG. 3 illustrates a conventional midspan configuration in a PoE system.

FIG. 3 illustrates a conventional midspan communications system 300 including a data-only switch 302, a midspan 306, multiple PD 314a-m, and a midspan controller 320. The data-only switch 302 has multiple transceiver ports 304a-n that are only capable of transmitting and receiving data. In other words, the data-only switch 302 supports high speed Ethernet communications, but does not support PoE and therefore cannot provide DC power to the PDs 314. (The data-only switch does support the communication of management traffic (e.g., packets), which is just another form of data.) However, there are occasions (as shown in FIG. 3) where the data-only switch 302 communicates with Powered Devices 314a-m, which are designed to be powered over the communications medium. Accordingly, the midspan 306 is inserted between the data-only switch 302 and the PDs 314 so as to inject the DC power needed to supply the PDs 314.

The midspan 306 includes transceiver data ports 308a-m that communicate high-speed data with the data-only switch 302 over corresponding communications links 316a-m. Likewise, the midspan 306 also includes transceiver data ports 312a-m that communicate high-speed data with the PDs 314a-m over corresponding communication links 318a-m. The midspan 306 includes a DC power supply 322 and magnetics (e.g. transformers) similar to that shown in FIG. 2, so as to inject the appropriate DC power to supply the PDs 314a-m. The conventional midspan 306 further includes a management port 310 that is dedicated to passing power management traffic between the data-only switch 302 and the midspan controller 320. The management traffic is necessary for the switch 302 and the midspan controller 320 to communicate the power requirement needs of the PDs 314, which are to be powered by the midspan 306. It is noted that the management traffic may carry other management information as well. For example, it could also carry manufacture's information regarding the midspan. The midspan controller 320 then programs the power supply 322 for each of the ports 312a-m in the midspan 306 based on the power requirement needs of the PDs 314a-m. The midspan controller 320 also performs various other house keeping functions for the midspan 306 such as monitoring the power requirements of the various ports over time in comparison to the total power supply available.

The power management traffic is transmitted at a relatively low data rate compared to the high speed Ethernet data carried by the Ethernet links 316. Further, the midspan management port 310 is a dedicated port that carries only management traffic, meaning the corresponding port 304n on the data-only switch 302 is also exclusively dedicated to carrying the power management traffic. Given the relatively low data rate for management traffic, the conventional midspan configuration of utilizing a dedicated management port is an inefficient use of silicon chip area for both the midspan 306 and the data-only switch 302. Further, the number of system ports, and therefore cost, is also increased by having a dedicated management port. Still further, data switches preferably have an even number of ports, (e.g. 24, 48, etc.). Therefore the extra management port 304n on the data switch adds an extra odd-numbered port (25 in FIG. 3) that detracts from the even symmetry of the silicon device. A switch or midspan having an odd number of ports is inherently undesirable, due to the fact that most communication racks that house the switches are typically designed to house devices with an even number of ports.

It is noted that the management packets described herein include, but are not limited to, layer 2 or higher packets and frames of the well-known IEEE communications layer protocol.

Figure 4:
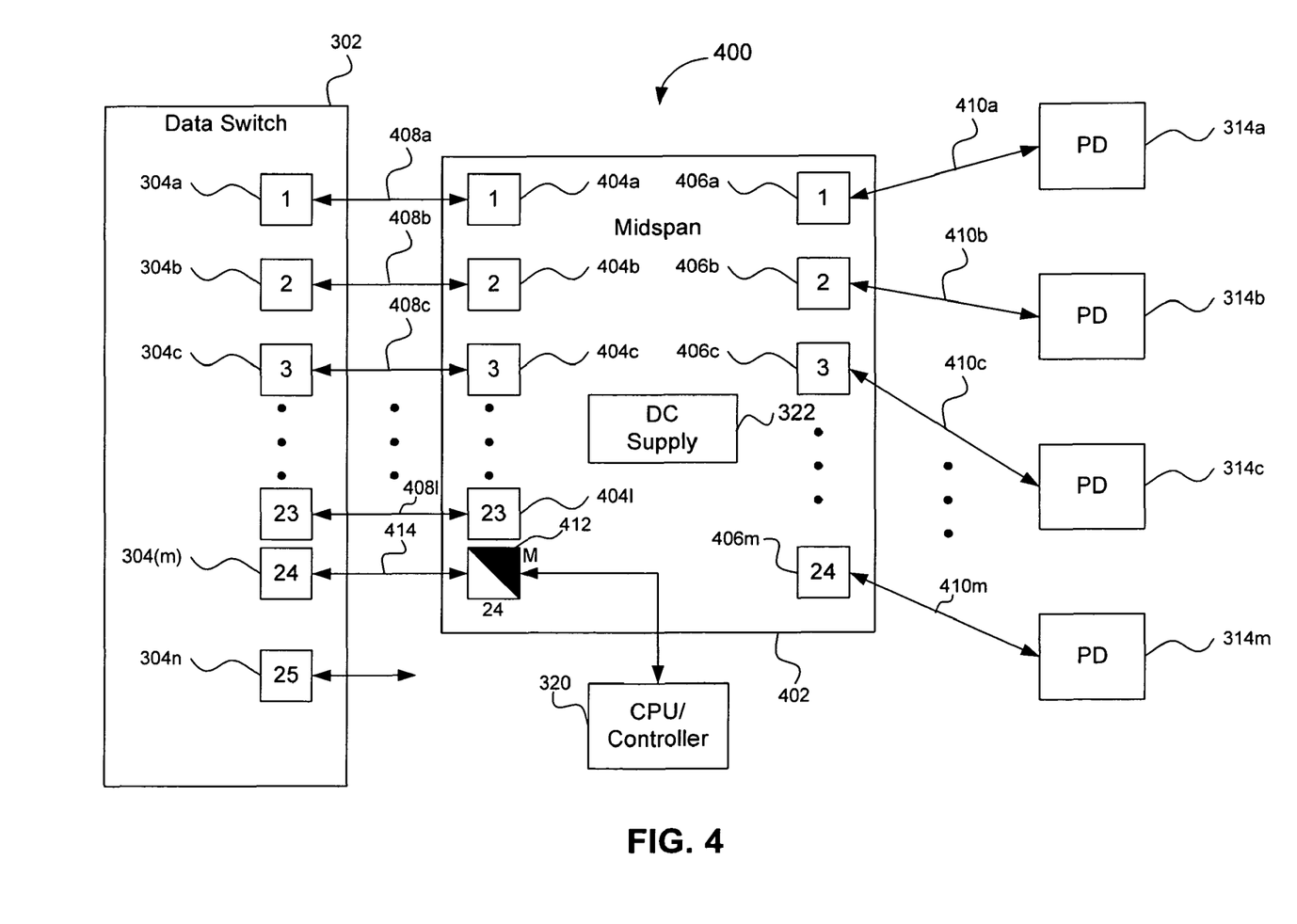
FIG. 4 illustrates a midspan configuration with a combination data and management port.

FIG. 4 illustrates a midspan communications system 400. Embodiments according to midspan communication system 400 are described in detail in commonly owned U.S. patent application Ser. No. 11/518,942, filed Sep. 12, 2006.

The midspan communications system 400 includes the data-only switch 302, a midspan 402, and the PD 314a-m, where the midspan 402 is configured such that it does not require a separate management port for the processing of power management traffic with the data switch 302. Accordingly, both the midspan 402 and the data-only switch 302 can be configured to more efficiently use their available silicon area.

The midspan 402 includes transceiver data ports 404a-l that communicate high-speed data with the data-only switch 302 over corresponding communications links 408a-l. Likewise, the midspan 402 also includes transceiver data ports 406a-m that communicate high-speed data with the PDs 314a-m over corresponding communication links 410a-m. As with midspan 306, the midspan 402 includes a DC power supply and magnetics (e.g. transformers) similar to that shown in FIG. 2, so as to inject the appropriate DC power to supply the PD 314a-m.

The midspan 402 also includes a combination data and management port 412 that processes both data and power management traffic. The power management traffic is communicated between the data switch 302 and the midspan controller 320 so as to manage the DC power injection on the outgoing midspan ports 406a-m to the PDs 314a-m. The data/management port 412 processes both high speed Ethernet data from the data switch 302 and the low speed power management traffic on the single port over a combined Ethernet and management link 414. The high speed Ethernet traffic is directed to any one of the ports 406a-m so as to effect communication with the PDs 314a-m. The low speed management traffic is directed to the external midspan controller 320 so the data switch 302 and the midspan controller 320 can communicate regarding the power supply needs of the PDs 314. As such, the combination data and management port 412 obviates the need for a dedicated management port on the midspan 402, and on the data-only switch 302.

As seen in FIG. 4, this has an obvious benefit for the data-only switch 302 because the port 304n is freed-up for additional data-only communications. Whereas, in the conventional midspan configuration 300, the switch port 304n was needed for management traffic. Accordingly, the freed switch port 304n can be used for an additional PoE data link that is coupled to another midspan, or it can be used for a non-PoE data link. In other words, it can be used to communicate with non-PoE devices. Alternatively, the freed switch port 304n can simply be eliminated so that the data switch 302 has an even number of ports. Either way, the IC device area is more efficiently used as compared with the conventional configuration that is shown in FIG. 3.

Power Over Ethernet (PoE) Powering Techniques

Current IEEE compliant PoE systems provide power using one of two powering techniques. These powering techniques are known as "Alternative A" and "Alternative B."

Figure 5:
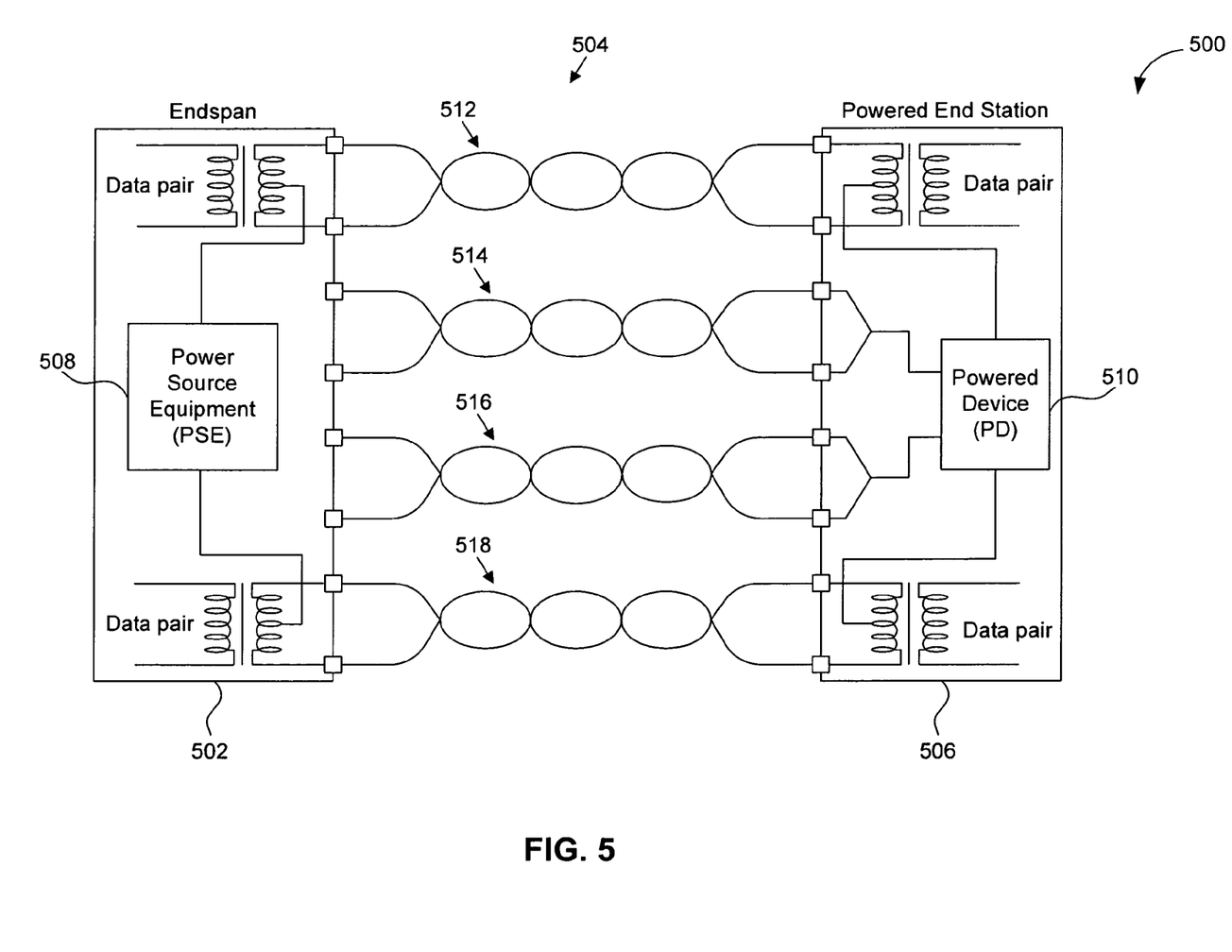
FIG. 5 illustrates a PoE system using the Alternative A powering technique.

FIG. 5 illustrates an IEEE compliant PoE system 500 using Alternative A. PoE system 500 includes an endspan 502 (also referred to as "endspan") and a Powered End Station 506, connected by an Ethernet cable 504.

Endspan 502 is a data and power switch. Endspan 502 includes a PSE 508. Endspan 502 may also include other components similar to those described above with respect to PSE 102.

Powered End Station 506 includes a Powered Device (PD) 510. Powered End Station 506 may also include other components similar to those described above with respect to PD 106.

Ethernet cable 504 includes four conductor pairs 512, 514, 516, and 518. Typically, Ethernet cable 504 is a CAT 5 cable. Alternatively, Ethernet cable 504 may be a CAT 3, CAT 5e, CAT 6, CAT 6a, or CAT 7, for example.

Endspan 502 transmits both data and power to Powered End Station 506. In PoE system 500, endspan 502 uses Alternative A to perform data and power transmission. Accordingly, endspan 502 simultaneously applies data and power onto the same two conductor pairs 512 and 518 of Ethernet cable 504.

Figure 6:
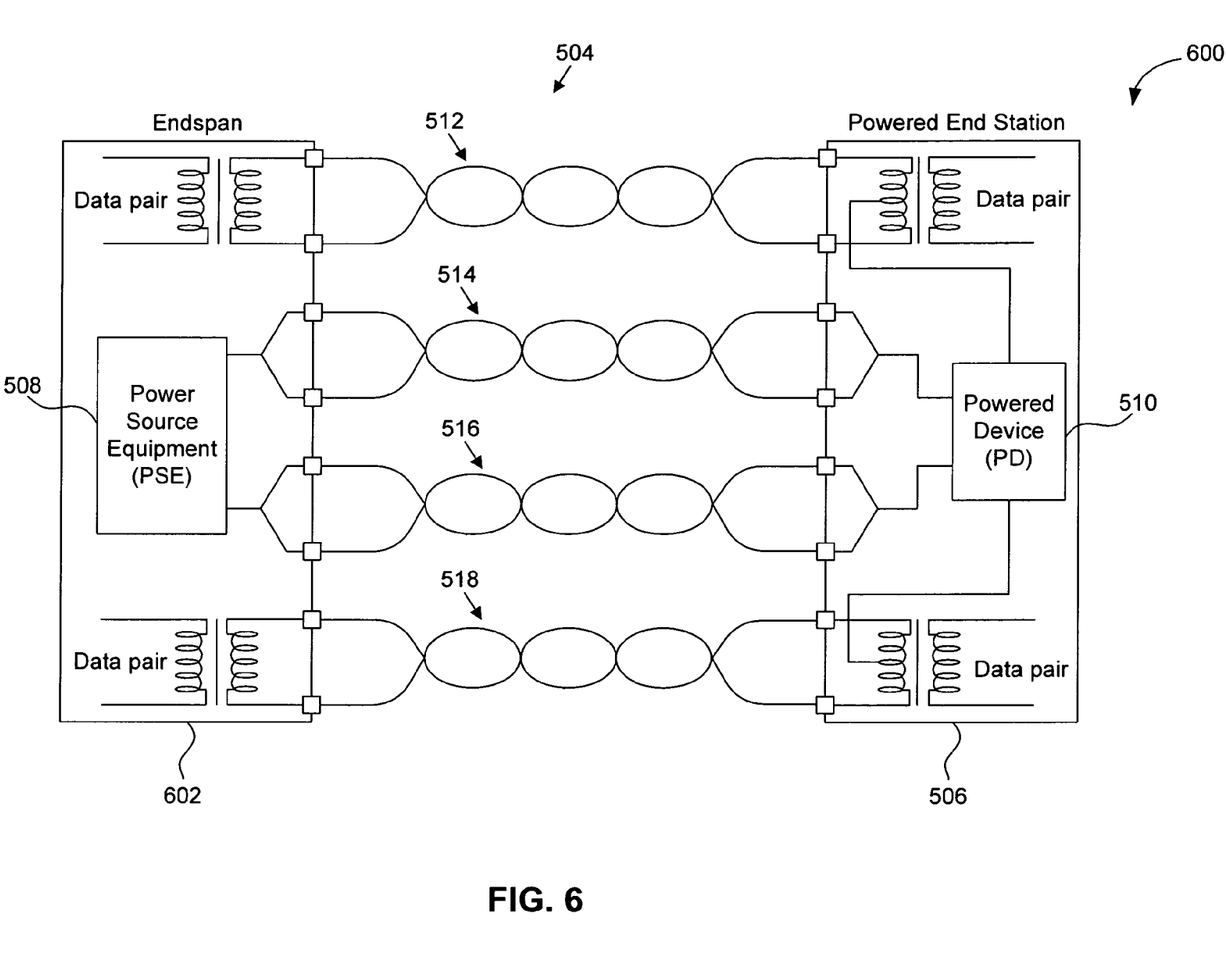
FIG. 6 illustrates a PoE system using the Alternative B powering technique.

Conductor pairs 514 and 516 remain unused in PoE system 500. The endspan can alternatively use Alternative B to perform data and power transmission, as illustrated in FIG. 6.

Similar to PoE system 500, PoE system 600 includes an endspan 602 and a Powered End Station 506, connected by an Ethernet cable 504.

Endspan 602 transmits both data and power to Powered End Station 506. To perform that, however, endspan 602 uses Alternative B, which includes transmitting data and power on distinct conductor pairs of Ethernet cable 504. Accordingly, endspan 602 transmits power over conductor pairs 514 and 516 and data over conductor pairs 512 and 518 of Ethernet cable 504.

Figure 7:
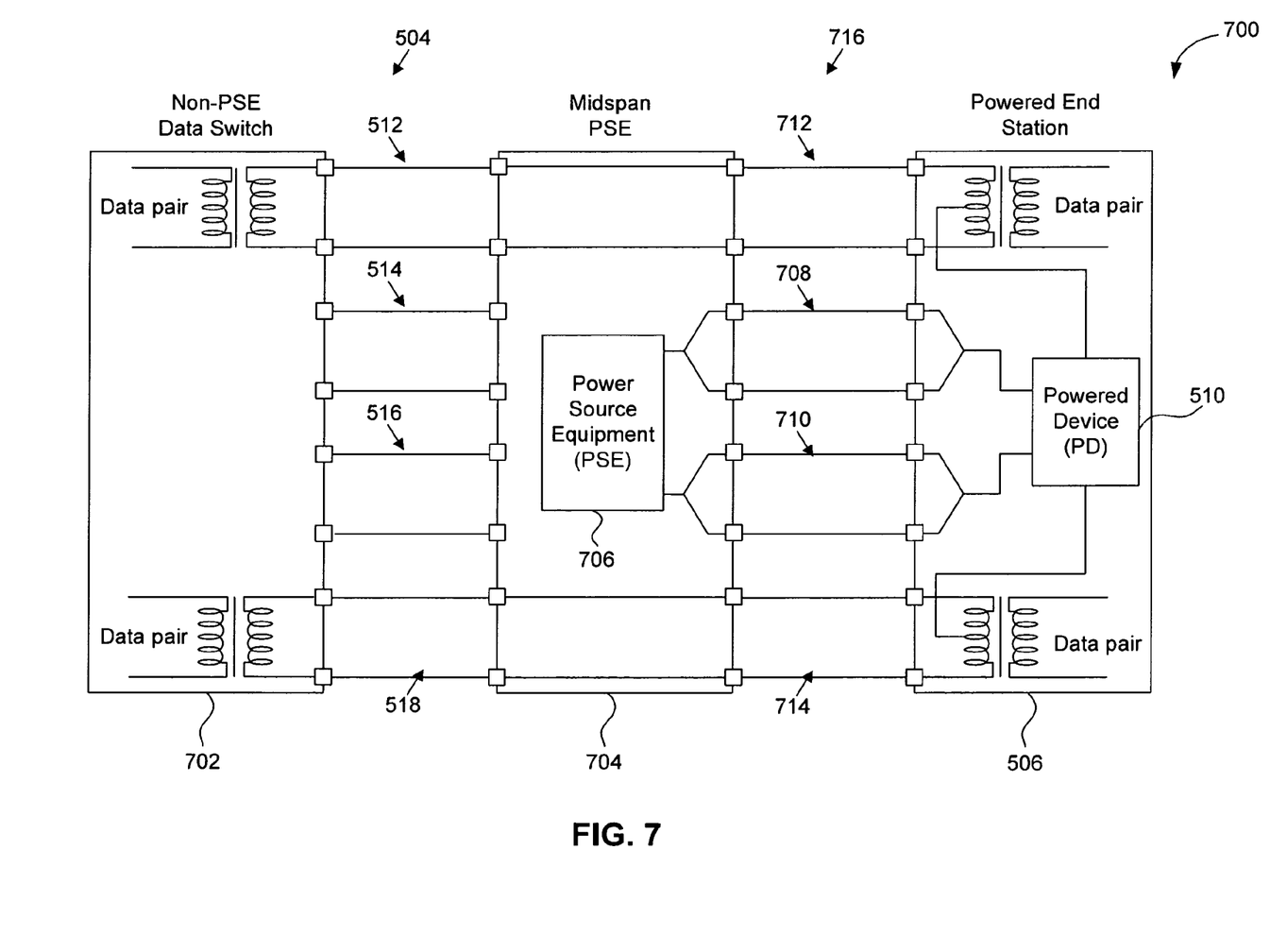
FIG. 7 illustrates a PoE system using the Alternative B powering technique in a midspan PSE configuration.

Alternative B can also be used when data is being provided from a data switch having no power transmission capabilities. This is shown in FIG. 7, which illustrates a PoE system 700 using a midspan PSE configuration.

PoE system 700 includes a Non-PSE Data Switch 702, a Midspan PSE 704, and a Powered End Station 506.

Non-PSE Data Switch 702 is a data-only switch. Accordingly, Non-PSE Data Switch 702 provides only data over conductor pairs 512 and 518 of Ethernet cable 504. Data carried by conductor pairs 512 and 518 traverses Midspan PSE 704 without any modification to reach Powered End Station 506, where it is received. As illustrated, conductor pairs 512 and 518 are coupled directly to conductor pairs 712 and 714 of Ethernet cable 716, which connects Midspan PSE 704 and Powered End Station 506.

Midspan PSE 704 is used to compensate for the lack of power transmission capabilities of Non-PSE Data Switch 702. As such, Midspan PSE 704 includes a PSE 706. Midspan PSE 704 can be placed anywhere along the Ethernet path between Non-PSE Data Switch 702 and Powered End Station 506. Midspan PSE 704 provides the DC power injection necessary to the power the PD device(s) 510.

Combined Endspan-Midspan PoE Powering Techniques

As described above, embodiments of the present invention include PoE system configurations that enable concurrent use of endspans and midspans. As such, midspans can be used to complement the power supply capabilities of endspans, or vice versa. Embodiments of the present invention can be used to enable higher-power PoE systems. Further, embodiments of the present invention are particularly suitable for upgrading the power supply capabilities of deployed PoE systems. For example, PoE systems having limited power supply capabilities and/or ports designed for lower power (e.g., chassis or stackable PoE systems) can benefit from embodiments of the present invention. This overcomes system limitations, particularly PSE power scaling limitations, to enabling higher-power PoE systems.

Figure 8:
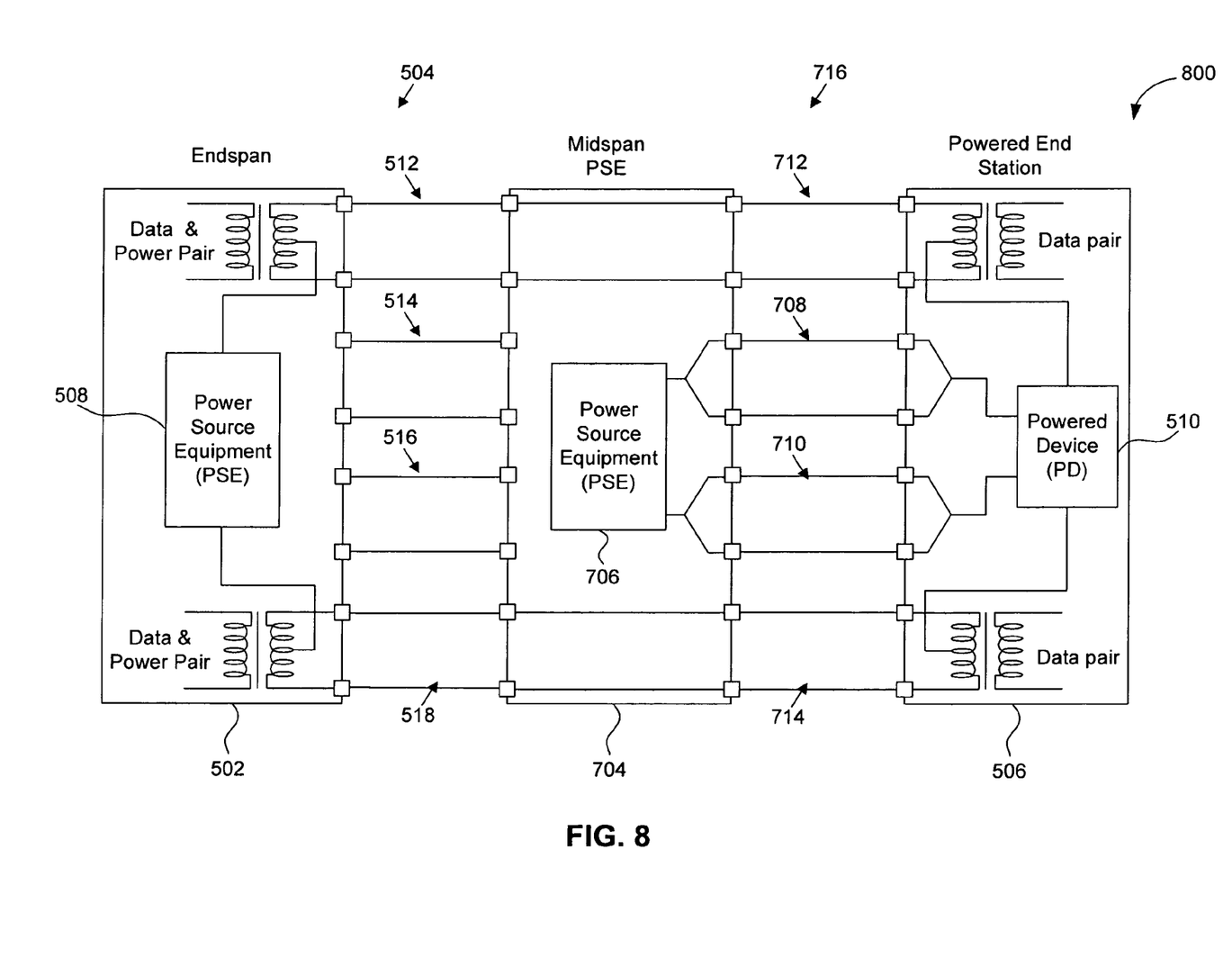
FIG. 8 illustrates an example PoE system using an endspan-midspan configuration according to an embodiment of the present invention.

FIG. 8 illustrates an example PoE system 800 that uses an endspan-midspan configuration according to an embodiment of the present invention.

PoE system 800 includes an endspan 502, a Midspan PSE 704, and a Powered End Station 506.

As illustrated, both endspan 502 and Midspan PSE 704 include PSEs. As such, higher power can be generated to provide to PD 510 of Powered End Station 506, overcoming the PSE power scaling limitation described above. This is because both endspan 502 and Midspan PSE 704 provide DC power to Powered End Station 506, instead of just one PSE.

In example PoE system 800, endspan 502 uses the Alternative A powering technique. As such, endspan 502 uses data pairs 512 and 518 of Ethernet cable 504 to transmit power to Powered End Station 506. As in midspan configuration 700, conductor pairs 512 and 518 traverse Midspan PSE 704 without any modification, before they are coupled directly to conductor pairs 712 and 714 of Ethernet cable 716.

Midspan PSE 704 uses the Alternative B powering technique. As such, Midspan PSE 704 uses unused (i.e., carrying no data) conductor pairs 708 and 710 of Ethernet cable 716 to transmit power to Powered End Station 506. Note that conductor pairs 514 and 516 of Ethernet cable 504, which connects endspan 502 and Midspan PSE 704, are unused and terminate at Midspan PSE 704.

As illustrated in FIG. 8, the endspan-midspan configuration of example PoE system 800 fully exploits the power transmission capacity of the Ethernet path that powers the PD. In other words, PD 510 receives power over all four conductor pairs of Ethernet cable 716. It is noted that, according to IEEE 802.3, a PD can receive power over any conductor pair of the Ethernet cable. Additional circuitry may be needed at PD 510 to enable PD 510 to receive power over all four conductor pairs of Ethernet cable 716.

Figure 9:
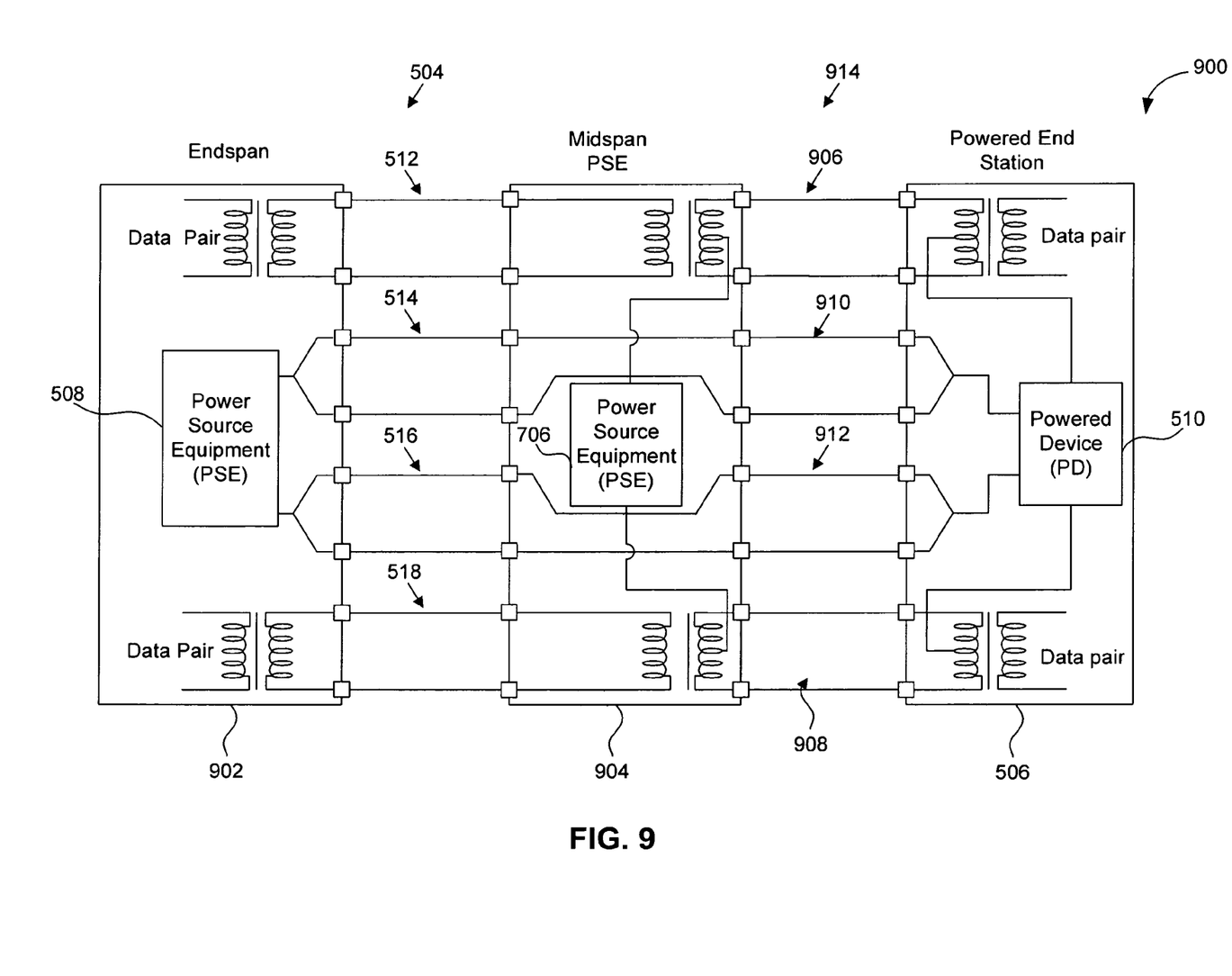
FIG. 9 illustrates an example PoE system using an endspan-midspan configuration according to another embodiment of the present invention.

FIG. 9 illustrates an example PoE system 900 using an endspan-midspan configuration according to another embodiment of the present invention, whereby the midspan PSE uses the Alternative A powering technique.

PoE system 900 includes an endspan 902, a Midspan PSE 904, and a Powered End Station 506.

Endspan 902 is substantially similar in terms of components and functions to endspan 502, described above. However, endspan 902 uses the Alternative B powering technique. As illustrated, PSE 508 of endspan 902 uses unused (i.e., carrying no data) conductor pairs 514 and 516 of Ethernet cable 504 to transmit power to Powered End Station 506 via the midspan 904. Conductor pairs 514 and 516 directly couple respectively to conductor pairs 910 and 912 of Ethernet cable 914, which connects Midspan PSE 904 and Powered End Station 506.

On the other hand, Midspan PSE 904 uses the Alternative A powering technique. As such, in addition to including a PSE 706, Midspan PSE 904 includes transformer circuitry to apply power generated by PSE 706 onto data conductor pairs 906 and 908 of Ethernet cable 914.

Similar to example PoE system 800, the endspan-midspan configuration of example system 900 fully exploits the power transmission capacity of the Ethernet path that powers the PD. Indeed, PD 510 receives power over all four conductor pairs of Ethernet cable 914. Further, the PSE power scaling limitation described above is similarly eliminated by powering PD 510 using both PSE 508 and PSE 706.

It is noted that a choice in favor of one or the other of the two configurations of example systems 800 and 900 may depend on the power capabilities of the endspan and the midspan, the positioning of the midspan relative to the powered end station, and/or the resistance of the Ethernet path (including the connectors) between the endspan and the powered end station.

Figure 10:
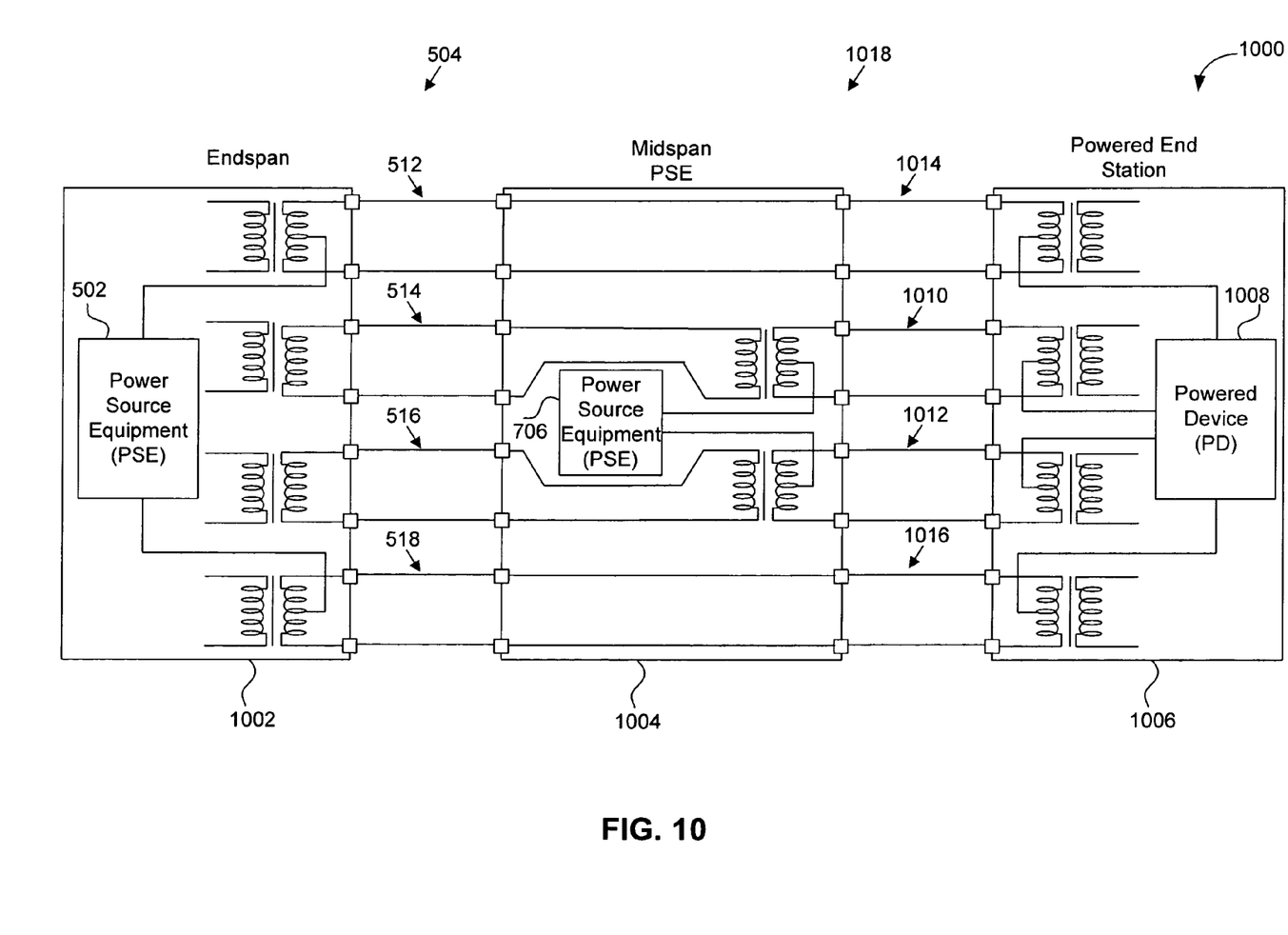
FIG. 10 illustrates an example PoE system using an endspan-midspan configuration according to another embodiment of the present invention.

Higher data rate implementations of the endspan-midspan configuration according to the present invention are also possible. For example, configurations that support 1000BASE-T, 2.5GBASE-T, 5GBASE-T, and 10GBASE-T can be implemented. FIG. 10 illustrates an example PoE system 1000 that uses an endspan-midspan configuration according to an embodiment of the present invention and supports up to 1000BASE-T (Gigabit Ethernet) Ethernet communications.

Example PoE system 1000 includes an endspan 1002, a Midspan PSE 1004, and a Powered End Station 1006.

Endspan 1002 is substantially similar in terms of components and functions to endspan 502, described above. However, endspan 1002 transmits data over all four conductor pairs 512, 514, 516, and 518 of Ethernet cable 504, which connects endspan 1002 to Midspan PSE 1004. Endspan 1002 also transmits DC power over conductors pairs 512 and 518, to provide a portion of the power for powered device 1008.

Conductor pairs 512 and 518 traverse Midspan PSE 1004 without any modification, where they are directly coupled respectively to conductor pairs 1014 and 1016 of Ethernet cable 1018, which connects Midspan PSE 1004 and Powered End Station 1006. On the other hand, power is injected onto conductor pairs 514 and 516 at Midspan PSE 1004, before they are coupled respectively to conductor pairs 1010 and 1012 of Ethernet cable 1018.

At Powered End Station 1006, data is received on all four conductor pairs 1010, 1012, 1014, and 1016 of Ethernet cable 1018. Similarly, power is also received on all four conductor pairs 1010, 1012, 1014, and 1016 to power PD 1008, greatly increasing the power available to powered device 1008.

As would be understood by a person skilled in the art based on the teachings herein, a variation of example PoE system 1000 would include endspan 1002 transmitting power over conductor pairs 514 and 516 and Midspan PSE 1004 transmitting power over conductor pairs 512 and 518.

As such, example PoE system 1000 provides a high power, high data rate PoE system, which fully exploits both the total power and data transmission capacity of the Ethernet path connecting the endspan to the PD. This allows PoE system 1000 to be used to power high-powered devices not supportable by current IEEE compliant PoE systems. Also, as with systems 800 and 900, system limitations to enabling higher-power PoE are overcome. Particularly, limitations due to power scaling at the PSE can be eliminated. This is especially beneficial for deployed PoE systems having limited power supply capabilities and/or ports designed for lower power (e.g., chassis or stackable PoE systems).

Power Management Scheme for Endspan-Midspan Configurations

FIGS. 8-10, described above, illustrated different endspan-midspan configurations according to the present invention. As described, the different configurations present efficient solutions for providing increased power at the PD when the endspan PSE alone is not capable of supporting this increased power. These configurations include inserting a midspan PSE between the endspan PSE and the PD.

However, merely inserting a midspan PSE between the endspan PSE and the PD does not completely solve the problem. In fact, doing so would result in undeterministic behavior, where any one of a number of scenarios could occur. For example, one scenario that can be envisioned is that upon connecting the PD to the PoE system, either the midspan PSE or the endspan PSE may discover the PD first, and, consequently, power it exclusively. Further, though it is unlikely that both the endspan PSE and the midspan PSE will simultaneously power the PD, were that to occur it may result in inefficient use of power. For example, each PSE may attempt to independently power the PD without regard to the power being provided by the other PSE, resulting in the PD being either under-powered or over-powered.

There is a need therefore to have the endspan PSE and the midspan PSE cooperate to jointly power the PD and to allocate supplied power between them so as to make optimal use of available power. A power management scheme according to the present invention, directed to enabling this needed endspan-midspan power cooperation, will now be described.

Figure 11:
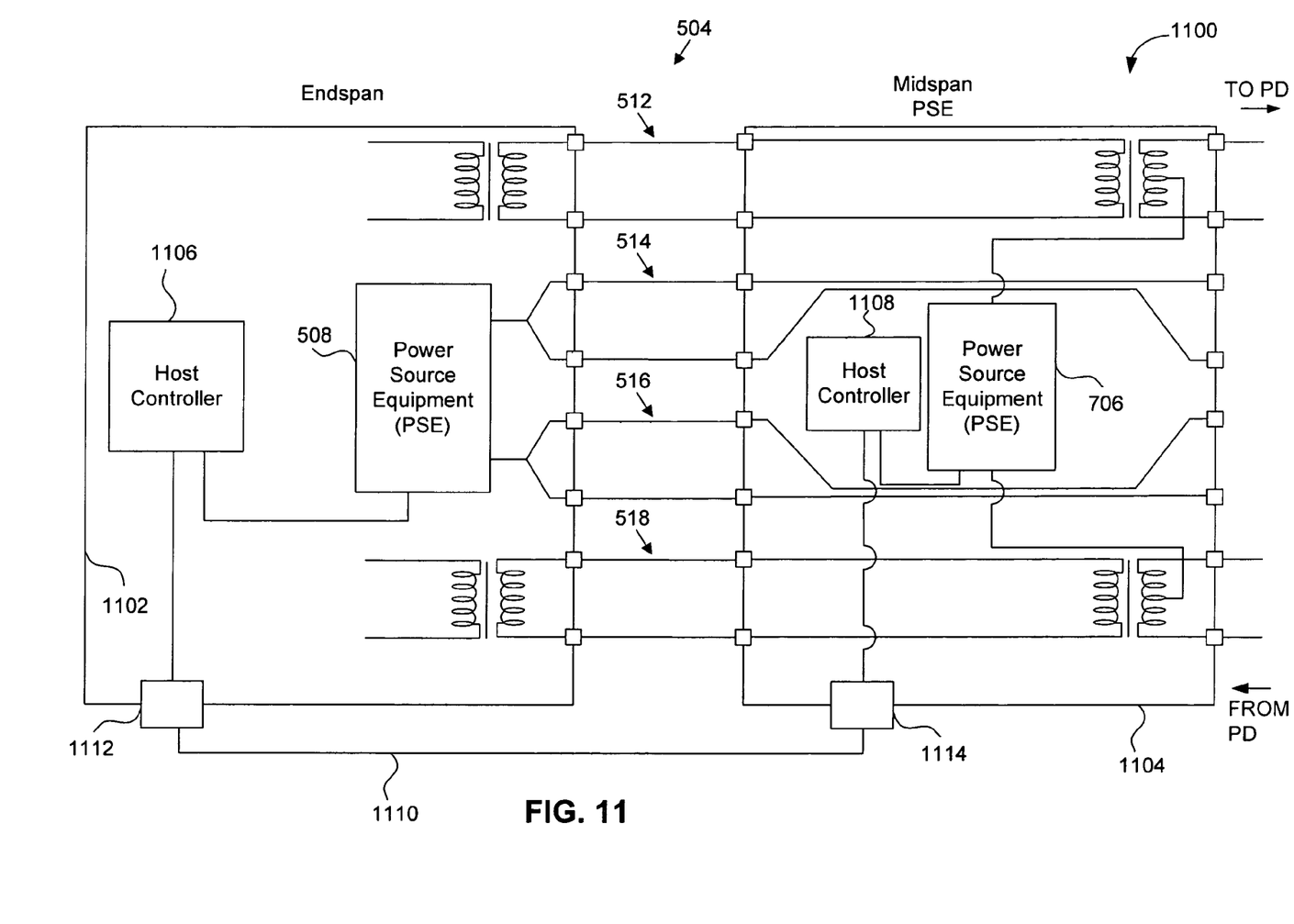
FIG. 11 illustrates an example PoE system that uses a power management channel according to an embodiment of the present invention.

FIG. 11 illustrates an example PoE system 1110 which uses a power management scheme according to an embodiment of the present invention.

PoE system 1100 uses an endspan-midspan configuration, as described above with respect to FIG. 9. Accordingly, PoE system 1100 includes an endspan 1102 and a Midspan PSE 1104, connected by Ethernet cable 504, as illustrated in FIG. 11. For ease of illustration, the PD being powered by endspan 1102 and Midpsan PSE 1104 is not shown in FIG. 11.

Endspan 1102 includes a PSE 508 and a Host Controller 1106. Host Controller 1106 controls PSE 508 to supply a first output power over conductor pairs 514 and 516 of Ethernet cable 504. Similarly, Midspan PSE 1104 includes a PSE 706 and a Host Controller 1108. Host Controller 1108 controls PSE 706 to inject a second output power over conductor pairs 512 and 518 of Ethernet cable 504.

Further, endspan 1102 and Midspan PSE 1104 respectively include ports 1112 and 1114, which enable a power management channel 1110 between endspan 1102 and Midspan PSE 1104. In an embodiment, power management channel 1110 provides a communication channel between Host Controller 1106 of endspan 1102 and Host Controller 1108 of Midspan PSE 1104. Accordingly, Host Controller 1106 is enabled, through Host Controller 1108, to control PSE 706 of Midspan PSE 1104. Alternatively, Host Controller 1106 is enabled to directly control PSE 706 of Midspan PSE 1104, without communicating with Host Controller 1108. As such, endspan 1102 is enabled to configure both the first and the second output powers supplied respectively by PSE 508 and PSE 706. In addition, as will be further described below, this configuration of the first and second output powers can be dynamically performed.

As shown in example PoE system 1100, ports 1112 and 1114 enable an out-of-band power management channel 1110, dedicated to power management traffic. This is similar to the communication of power management traffic in the PoE system of FIG. 3 described above. Alternatively, the power management channel can be enabled over an existing in-band data channel between endspan 1102 and Midspan PSE 1104. Accordingly, endspan 1102 and Midspan PSE 1104 would each include a combination data/management port, as described above with respect to FIG. 4.

Communication between endspan 1102 and Midspan PSE 1104 can be achieved using a Layer 1 (L1), Layer 2 (L2), or a Layer 3 (L3) protocol. Further, communication can be achieved via any one of serial communication, parallel communication, L2 packets, L3 packets, Link Layer Discover Protocol (LLDP) packets, Operation Administration and Maintenance (OAM) packets, and Ethernet packets.

According to an embodiment of the present invention, when a PD is connected to PoE system 1100, each of endspan 1102 and Midspan PSE 1104 independently performs detection and classification of the PD. The classification capabilities of endspan 1102 and Midspan PSE 1104 may differ depending on the communication protocols that endspan 1102 and Midspan PSE 1104 support to communicate with the PD. For example, endspan 1102 may be capable of communicating with the PD using a Layer 1 (L1) or a Layer 2 (L2) protocol, where higher classification accuracy of the PD is achievable when the L2 protocol is used. Similarly, Midspan PSE 1104 may have capabilities to support L1 or L2 communication with the PD. A baseline for classification using L1 and L2 can be found at http://www.ieee802.org/3/at/public/nov06/diab_schindler_1106_1.pdf.

In an embodiment, endspan 1102 and Midspan PSE 1104 both use L2 in classifying the PD. As such, PD classification is limited to a range of power levels. For example, in the case of IEEE 802.3 at, the power range is limited to power levels of 15.4 Watts, 25 Watts, and 39 Watts. Accordingly, a PD that requires power in between these power levels will likely receive higher power than it needs. Nonetheless, by giving endspan 1102 the ability to configure the first and second output powers supplied from PSE 508 and PSE 706, overpowering inefficiency can be reduced. For example, one scenario that could occur when no power coordination between endspan 1102 and Midspan PSE 1104 is used includes both endspan 1102 and Midspan PSE 1104 each independently powering the PD, thereby providing the PD more than two times its required power. However, with endspan 1102 having the ability to configure the first and second output powers, endspan 1102 can have either PSE 508 or PSE 706, but not both, power the PD, thereby reducing by a half the overpowering inefficiency. In other scenarios, endspan 1102 can have both PSE 508 and PSE 706 power the PD. Accordingly, endspan 1102 can configure the first and second output powers from a fixed range of power levels according to the required power of the PD.

In another embodiment, Midspan PSE 1104 uses L1 but endspan 1102 uses L2 to classify the PD. As such, endspan 1102 can precisely determine the power required by the PD. In an embodiment, Midspan PSE 1104 independently specifies the second output power upon detection and classification of the PD. For example, Midspan PSE 1104 specifies the second output power from a fixed range of power levels. Subsequently, however, endspan 1102 reconfigures the second output power after start up of the PD. In an embodiment, endspan 1102 dynamically configures the first and second output powers according to one or more of the power required by the PD and available power at PSE 508 and PSE 706. For example, endspan 1102 may specify the first output power from a fixed range of power levels and configure the second output power according to the first output power and the required power of the PD. Alternatively, endspan 1102 may specify the second output power from a fixed range of power levels and configure the first output power according to the second output power and the required power of the PD. For example, assuming a PD requires 26 Watts, endspan 1102 may instruct PSE 706 (or alternatively PSE 508) to provide 15.4 Watts (from the fixed range of power levels enabled by L1 classification) and PSE 508 (or alternatively PSE 706) to provide the remainder of 10.6 Watts. Accordingly, in this scenario, PSE 706 provides very coarse tuning using a number of discrete power levels, and PSE 508 provides the incremental fine tuning to provide substantially the exact power level desired by the PD. Alternatively, endspan 1102 may instruct one or the other of PSE 508 and PSE 706 to entirely provide 26 Watts. As such, the PD receives exactly the amount of power it requires, resulting in optimal PD power allocation. In another embodiment, endspan 1102 is an IEEE 802.3af power capable endspan having L2 communication capability and the PD is a higher power PD. As such, endspan 1102 can power the PD according to 802.3af (i.e., supplying a maximum of 15.4 Watts) and instruct PSE 706 to supply the remainder of required PD power.

It is noted that this optimal PD power allocation would not be possible without power coordination between endspan 1102 and Midspan PSE 1104. Indeed, even if both endspan 1102 and Midspan PSE 1104 are capable of L2 classification of the PD, sub-optimal PD power allocation can still occur if endspan 1102 and Midspan PSE 1104 independently attempt to power the PD.

Power sharing/coordination between endspan 1102 and Midspan PSE 1104 has been described above with respect to a single PD being powered by the PoE system. However, as would be appreciated by a person skilled in the art based on the teachings herein, this can be extended to a PoE system having a plurality of PDs, as illustrated in FIGS. 3 and 4, for example.

According to an embodiment of the present invention where multiple PDs are being powered by the PoE system, Midspan PSE 1104 reports to endspan 1102 the PDs that it discovers over its ports. For example, referring to FIG. 3, the PD may discover one or more PDs over its ports 312*a-m*. Further, Midspan PSE 1104 may report to endspan 1102 its power capability over each of its ports and its total available power.

Endspan 1102 may also discover one or more PDs over its ports. These PDs may include PDs commonly discovered with Midspan PSE 1104 or independently discovered by endspan 1102. Further, endspan 1102 has information regarding its own power capability over its ports and its total available power.

Accordingly, endspan 1102 can determine how to optimally allocate power between itself and Midspan PSE 1104 for each PD of the multiple PDs being powered by the PoE system. This optimal allocation takes into account available power at endspan 1102 and Midspan PSE 1104, power supply capabilities over the different ports of endspan 1102 and Midspan PSE 1104, and power requirements of the PDs.

Power allocation is generally performed at startup of the PoE system. As described above, however, power allocation can also be performed dynamically by endspan 1102 based on changes in available power at endspan 1102 and Midspan PSE 1104 and/or in power requirements of the PDs. For example, dynamic reconfiguration of power allocation may be performed when a new PD is connected to the PoE system or when an existing PD is disconnected from the PoE system.

Further features, according to the above, include the endspan 1102 instructing Midspan PSE 1104 to supply or stop supplying power over certain ones of its ports and/or to adjust power levels over other ports. Further, endspan 1102 may instruct Midspan PSE 1104 to power certain PD ports when endspan 1102 can only provide legacy power levels over these ports.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A Power over Ethernet (PoE) system, comprising:
an endspan having a first power source equipment (PSE);
a powered device (PD) coupled to said endspan via an Ethernet cable; and
a midspan, coupled between said endspan and said PD, having a second PSE;
wherein said first and second PSEs collectively provide respective first and second output powers to said PD, and wherein said endspan dynamically configures said first and second output powers according to one or more of a required power of said PD and available power at said first and second PSEs.

2. The PoE system of claim 1, wherein said endspan and midspan respectively use the Alternative A and Alternative B powering techniques, as specified in IEEE 802.3, over said Ethernet cable.

3. The PoE system of claim 1, wherein said endspan and midspan respectively use the Alternative B and Alternative A powering techniques, as specified in IEEE 802.3, over said Ethernet cable.

4. The PoE system of claim 1, wherein two conductor pairs of said Ethernet cable carry data, thereby enabling up to 100BASE-T Ethernet communications over said Ethernet cable.

5. The PoE system of claim 1, wherein four conductor pairs of said Ethernet cable carry data, thereby enabling up to 10GBASE-T Ethernet communications over said Ethernet cable.

6. The PoE system of claim 1, wherein said endspan and said midspan independently detect and classify said PD.

7. The PoE system of claim 6, wherein said midspan independently specifies said second output power upon detection and classification of said PD.

8. The PoE system of claim 7, wherein said endspan reconfigures said second output power after start up of said PD.

9. The PoE system of claim 1, wherein said endspan and midspan use Layer 1 (L1) classification of said PD, thereby said first and second output powers are specified from a fixed range of power levels according to a required power of said PD.

10. The PoE system of claim 1, wherein said endspan uses Layer 2 (L2) power classification of said PD, thereby having the ability to precisely determine a required power of said PD.

11. The PoE system of claim 10, wherein said endspan specifies said second output power from a fixed range of power levels and configures said first output power according to said second output power and said required power of said PD.

12. The PoE system of claim 10, wherein said endspan specifies said first output power from a fixed range of power levels and configures said second output power according to said first output power and said required power of said PD.

13. The PoE system of claim 10, wherein said midspan uses Layer 1 (L1) classification of said PD and specifies said second output power from a fixed range of power levels, and wherein said endspan re-configures said second output power according to said required power of said PD.

14. The PoE system of claim 1, wherein said endspan communicates via a power management channel with said midspan to configure said first and second output powers.

15. The PoE system of claim 1, wherein the first PSE includes a first power supply and the second PSE includes a second power supply, said first power supply and second power supply being separate from each other.

16. A Power over Ethernet (PoE) power management method, comprising:
detecting one or more powered devices (PDs) connected to a PoE system;
allocating power for each of said PDs between an endspan power source equipment (PSE) and a midspan PSE based at least on available power at said endspan PSE and midspan PSE.

17. The method of claim 16, wherein said detecting step comprises detecting PDs connected to ports of said endspan PSE and PDs connected to ports of said midspan PSE.

18. The method of claim 16, further comprising:
classifying said detected PDs according to power requirements of said PDs.

19. The method of claim 18, wherein said allocating step further comprises allocating power for each of said PDs between said endspan PSE and said midspan PSE based on said power requirements of said PDs.

20. The method of claim 16, further comprising:
providing to a controller information regarding PDs detected over ports of said endspan PSE and said midspan PSE, including power requirements of said detected PDs;
providing to said controller information regarding power supply capabilities over each port of said endspan PSE and said midspan PSE; and
providing to said controller information regarding said available power at said endspan PSE and said midspan PSE.

21. The method of claim 16, wherein said allocating step is performed at start up of said PoE system.

22. The method of claim 16, wherein said allocating step comprises dynamically allocating power between said endspan PSE and said midspan PSE based on changes in said available power.

23. The method of claim 16, wherein said allocating step is performed when a new PD is connected to said PoE system.

24. The method of claim 16, wherein said allocating step is performed when one of said PDs is disconnected from said PoE system.

* * * * *